(12) United States Patent
Chai et al.

(10) Patent No.: US 12,378,145 B2
(45) Date of Patent: Aug. 5, 2025

(54) BIORETENTION POND FOR RAINWATER TREATMENT

(71) Applicants: Chongqing University, Chongqing (CN); China Construction Industrial & Energy Engineering Group Co., Ltd., Nanjing (CN)

(72) Inventors: Hongxiang Chai, Chongqing (CN); Xinyue Wang, Chongqing (CN); Zhiyu Shao, Chongqing (CN); Haiyuan Ma, Chongqing (CN); Jingjing Hu, Chongqing (CN); Qiang He, Chongqing (CN); Yanhong Xu, Nanjing (CN); Qichang Ni, Nanjing (CN); Fujian Liu, Nanjing (CN)

(73) Assignees: CHONGQING UNIVERSITY, Chongqing (CN); CHINA CONSTRUCTION INDUSTRIAL & ENERGY ENGINEERING GROUP CO., LTD, Nanjing (CN)

(*) Notice: Subject to any disclaimer, the term of this patent is extended or adjusted under 35 U.S.C. 154(b) by 413 days.

(21) Appl. No.: 17/951,081

(22) Filed: Sep. 22, 2022

(65) Prior Publication Data
US 2023/0416129 A1  Dec. 28, 2023

(30) Foreign Application Priority Data
Jun. 27, 2022 (CN) .......................... 202210737002.3

(51) Int. Cl.
| | | |
|---|---|---|
| C02F 1/00 | (2023.01) | |
| C02F 3/30 | (2023.01) | |
| C02F 3/32 | (2023.01) | |
| C02F 9/00 | (2023.01) | |
| C02F 101/10 | (2006.01) | |
| C02F 101/16 | (2006.01) | |
| C02F 103/00 | (2006.01) | |

(52) U.S. Cl.
CPC ................ *C02F 9/00* (2013.01); *C02F 1/001* (2013.01); *C02F 3/305* (2013.01); *C02F 3/327* (2013.01); *C02F 2101/105* (2013.01); *C02F 2101/163* (2013.01); *C02F 2103/001* (2013.01)

(58) Field of Classification Search
CPC ................ C02F 1/001; C02F 2101/105; C02F 2101/16; C02F 2101/163; C02F 2103/001; C02F 3/04; C02F 3/302; C02F 3/305; C02F 3/327; C02F 9/00
USPC ..................................................... 210/170.03
See application file for complete search history.

(56) References Cited

U.S. PATENT DOCUMENTS 7,967,979 B2 * 6/2011 Grewal .................. C02F 3/327
                                                                210/170.03

* cited by examiner

*Primary Examiner* — Claire A Norris
(74) *Attorney, Agent, or Firm* — MATTHIAS SCHOLL P.C.; Matthias Scholl

(57) ABSTRACT

A bioretention pond includes a pond body and an overflow weir. The pond body includes a pond wall and a layered substrate. The layered substrate includes from bottom to top: a gravel layer, a transition layer, a pyrite layer, a plant layer, a pebble water layer, an organic layer, and a water storage layer. The overflow weir is disposed on the pebble water layer with a space left above the center of the pebble layer. The organic layer is disposed in the space and covers the pebble layer. The water storage layer is disposed onto the organic layer. The pond body further includes a perforated pipe disposed in the gravel layer; and the perforated pipe includes an outlet end disposed at the top part of the pyrite layer.

9 Claims, 2 Drawing Sheets

BIORETENTION POND FOR RAINWATER TREATMENT

CROSS-REFERENCE TO RELAYED APPLICATIONS

Pursuant to 35 U.S.C. § 119 and the Paris Convention Treaty, this application claims foreign priority to Chinese Patent Application No. 202210737002.3 filed Jun. 27, 2022, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to the field of rainwater treatment, and more particularly to a bioretention pond for rainwater treatment.

Sand is commonly used as a substrate in a conventional bioretention pond for rainwater treatment. Lack of a carbon source for denitrification, the sand substrate is incapable of degrading nitrate nitrogen, and can only remove a small amount of phosphorus through physical adsorption and precipitation. To improve the ability of the bioretention ponds for removing the nitrate nitrogen from rainwater, a traditional means is to modify the substrate of the bioretention ponds.

Substrate improvement refers to an alternation of a material or a component ratio of the substrate for special functions. For example, a medium having high cation exchange capacity is added to the substrate to increase the absorption of ammonia nitrogen; a material containing iron and aluminum, such as water treatment residuals or fly ash, is added to the substrate to facilitate the removal or precipitation of phosphorus; and an organic carbon source or inorganic substance, such as sawdust or sulfur, is added to provide electron donors to microorganisms in the substrate, thus enhancing denitrification.

However, the abovementioned substrate improvement often leads to secondary pollution. And the mixed substrate only serves one purpose. For example, zeolite does not absorb phosphorus and nitrate nitrogen; the material containing iron and aluminum only removes phosphorus; and the organic carbon sources such as wood chips, corn cobs, and rice husks remove ammonia nitrogen while also provoking the leaching of nutrients such as nitrogen and phosphorus, resulting in secondary pollution. A large growth of heterotrophic bacteria creates a lot of sludge that may block the flow of water in the substrate. Although the presence of sulfur as a carrier of electron donor does not increase the concentration of nutrient elements in an effluent, it acidifies the effluent and results in high concentration of sulfate radicals. Pyrite is abundant in nature, inexpensive, easily available, and performs well in denitrification. A pyrite suspension maintains a steady pH that allows little sulfate to build up. However, pyrite is inefficient in removal of nitrate nitrogen from the environment, because it provides a limited amount of electrons and performs slow denitrification in short-duration intense rainfall events.

SUMMARY

The disclosure provides a bioretention pond for denitrifying nitrate nitrogen in rainwater by using pyrite. During a heavy rainstorm, a carbon source is carried from plants to the bioretention pond by rainwater runoff and comes into contact with pyrite for heterotrophic denitrification. Sulfur-driven autotrophic denitrification occurs concurrently with the heterotrophic denitrification of nitrate nitrogen in the rainwater runoff. The carbon source supplies energy for the heterotrophic denitrification process by which nitrate nitrogen is removed from the rainwater runoff. And secondary pollution is reduced because the process leaves only a small fraction of the carbon source in an effluent.

The bioretention pond comprises a pond body and an overflow weir; the pond body comprises a pond wall and a layered substrate; the layered substrate comprises from bottom to top: a gravel layer, a transition layer, a pyrite layer, a plant layer, a pebble water layer, an organic layer, and a water storage layer; the overflow weir is disposed on the pebble water layer with a space left above the center of the pebble layer; the organic layer is disposed in the space and covers the pebble layer; the water storage layer is disposed onto the organic layer; the pond body further comprises a perforated pipe disposed in the gravel layer; and the perforated pipe comprises an outlet end disposed at a top part of the pyrite layer.

During light, short-duration heavy, and heavy rainfalls, the overflow weir is used to control the flow of rainwater passing through the organic layer. During light or short-duration heavy rainfall, rainwater runoff percolates through the overflow weir, the plant layer, and the pyrite layer successively, facilitating sulfur-driven autotrophic denitrification; and the carbon source is retained in the organic layer without causing secondary pollution. During heavy rainfall, the rainwater runoff overflows from the overflow weir, percolates through the organic layer, and transports the carbon source into the pyrite layer for heterotrophic denitrification. The sulfur-driven autotrophic denitrification occurs concurrently with the heterotrophic denitrification of nitrate nitrogen in rainwater runoff. A weir overflow rate is adjusted by changing a width of the overflow weir, so that a desired amount of the carbon source is transported to the pyrite layer for heterotrophic denitrification while preventing secondary pollution.

Figure 1:
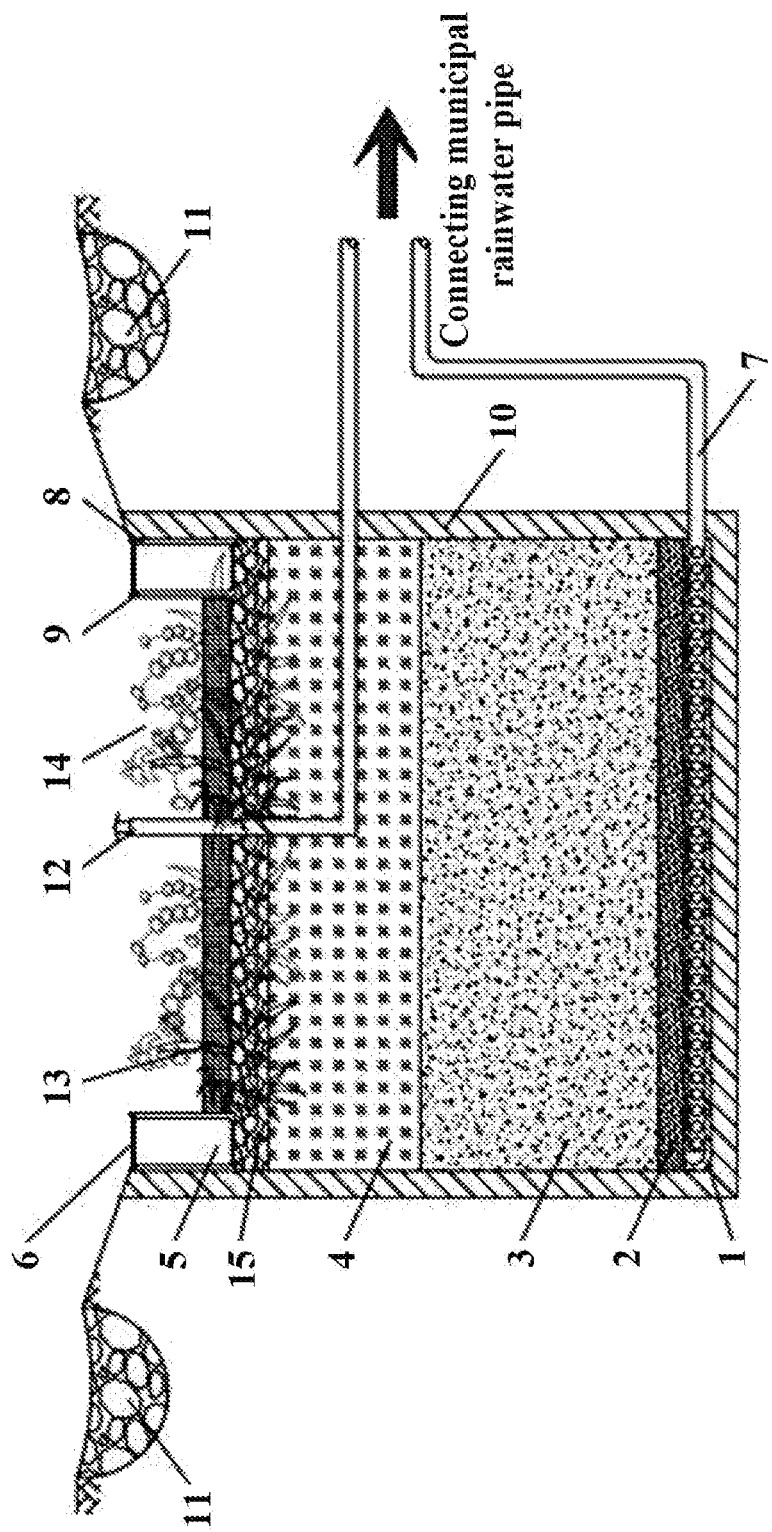
FIG. 1 is a perspective view of a bioretention pond for rainwater treatment according to one example of the disclosure.

In the drawings, the following reference numbers are used: 1. Gravel layer; 2. Transition layer; 3. Pyrite layer; 4. Plant layer; 5. Overflow weir; 6. Filter plate; 7. Perforated pipe; 8. Outer plate; 81. Threaded hole; 9. Inner plate; 92. Hook; 93. Telescoping pole; 94. Groove; 10. Pond wall; 11. Gravel drainage ditch; 12. Overflow pipe; 13. Overflow pipe; 14. Water storage layer; and 15. Pebble layer.

DETAILED DESCRIPTION OF THE EMBODIMENTS

As shown in FIG. 1, a bioretention pond for rainwater treatment comprises a pond body and an overflow weir 5; the pond body comprises a pond wall 10 and a layered substrate;

the layered substrate comprises from bottom to top: a gravel layer 1, a transition layer 2, a pyrite layer 3, a plant layer 4, a pebble layer 15, an organic layer 13, and a water storage layer 14; the overflow weir 5 is disposed on the pebble layer 15 with a space left above the center of the pebble layer 15; the outlet end of the overflow weir 5 and the top part of the pond wall 10 are at the same height from the ground; the organic layer 13 is disposed in the space and covers the pebble layer; the water storage layer 14 is disposed onto the organic layer; the pond further comprises a perforated pipe 7 disposed in the gravel layer 1; and the perforated pipe comprises an outlet end which is flush with a top part of the pyrite layer 3.

As shown in FIG. 1, the pond body further comprises an overflow pipe 12; the overflow pipe 12 comprises an inlet end, and outlet end, two straight sections, and a 90 degree elbow; the two straight sections are connected to each other by the 90 degree elbow; one of the two straight sections is disposed in the plant layer 4; the other one of the two straight sections extends upward through the organic layer 13 with the inlet end exposed to the water storage layer 14; and the outlet end is connected to a rainwater pipeline.

The bioretention pond further comprises a gravel drainage ditch 11 disposed around the pond wall 11; the gravel drainage ditch 11 comprises a distal side and a proximal side lower than the distal side; the distal side is away from the pond wall, and the proximal side is near the pond wall. The overflow weir 5 comprises a plurality of plates which is inserted into pebble layer to a depth of 1-3 cm. The overflow weir 5 has a height of 12-15 cm, which is higher than the organic layer 13 and the inlet end of the overflow pipe 12. The light rain flow into overflow weir 5 instead of the organic layer 13. The overflow weir 5 is covered with a filter plate 6 used to remove plastic and fallen leaves from the rainwater runoff. At least one plant is planted on the plant layer.

Figure 2:
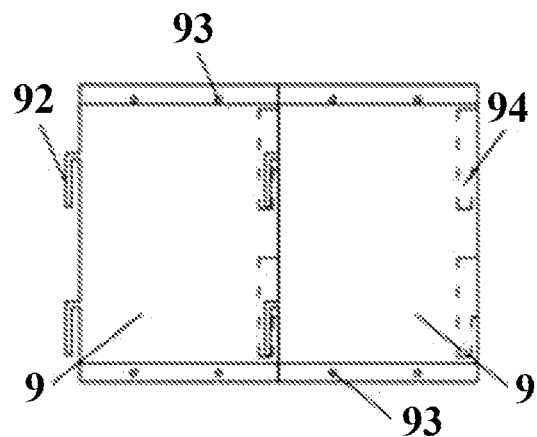
FIG. 2 is a cross sectional view of two inner plates according to one example of the disclosure.
Figure 3:
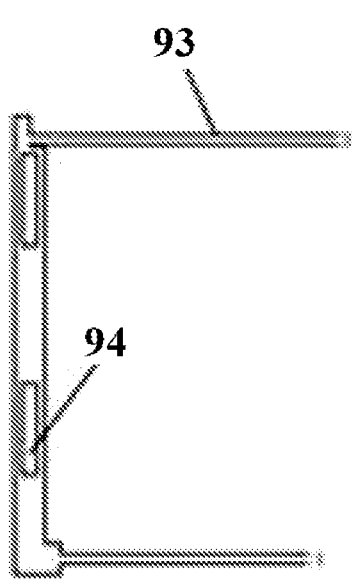
FIG. 3 is a right view of an inner plate according to one example of the disclosure.
Figure 4:
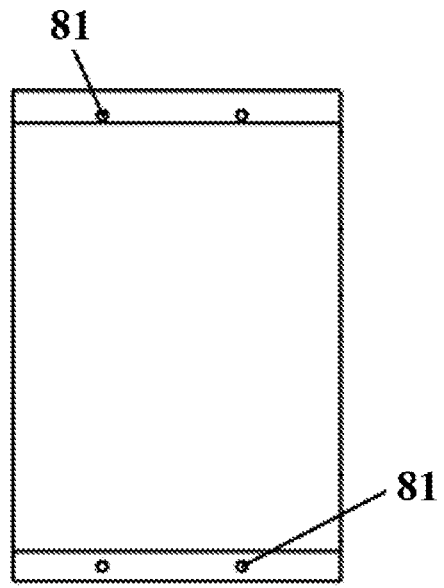
FIG. 4 is a perspective view of an outer plate according to one example of the disclosure.

As shown in FIGS. 1-2, the overflow weir 5 further comprises a plurality of outer plates 8 and a plurality of inner plates 9, and a channel is formed by the plurality of outer plates 8 and the plurality of inner plates 9; the plurality of outer plates 8 is fixedly disposed on the pond wall; the plurality of inner plates 9 is detachably disposed onto the substrate. One end of each of the plurality of inner plate 9 comprises at least one hook 92; the other end of each of the plurality of inner plate 9 comprises at least one groove 94; the at least one hook 92 is latched on the corresponding at least one groove 94, so that every two adjacent inner plates 9 are connected to each other. As shown in FIG. 3, an elastic material, such as rubber, is disposed at a connection between every two adjacent inner plates 9 to prevent water leakage; and each of the plurality of inner plates 9 comprises a first upper end and a first lower end, both of which comprises at least one telescoping pole 93. As shown in FIG. 4, each of the plurality of outer plates 8 comprises a second upper end and a second lower end, both of which comprises at least one threaded hole 81; the at least one telescoping pole 93 comprises a threaded end connected to the at least one corresponding threaded hole 81, so that plurality of inner plate 9 is fixedly disposed; and a length of the at least one telescoping pole 93 is adjustable, so that a width of the overflow weir is matched to the seepage velocity of the water in the bioretention pond in different climate regions.

During the construction of the bioretention pond, the width of the overflow weir is calculated by using the following formula:

$$\frac{\pi}{4}[D^2 - (D-2d)^2]h = W$$

where h is the height of each of the plurality of outer plates 9; D is the diameter of the pond body and calculated by using the following formula:

$$D = \sqrt{\frac{4F \times \alpha}{\pi}},$$

where F is the service area of the bioretention pond; $\alpha$ is the ratio of the surface area to the catchment area of the pond body; W is the amount of water accumulated in the overflow weir and calculated by using the following formula:

$$W = \left(Q - K \times \pi \left(\frac{D}{2}\right)^2 \times \varphi\right) \times T,$$

where T is the design overflow time, K is the seepage velocity of the water in a substrate, $\varphi$ is the substrate porosity, Q is the maximum rate of the rainwater runoff and calculated by using the following formula: $Q=\Psi Fq$, where $\Psi$ is the composite runoff coefficient; q is the design rainfall intensity and calculated by using the following formula:

$$q = \frac{167A_1(1+lgP)}{(t+b)^n},$$

where P is the design return period, t is rainfall duration, and $A_1$, b, and n are local parameters.

The organic layer 13 comprises an agricultural material, such as bark, sawdust, coconut husk, and corn cob; the agricultural material has a particle size of greater than 2 cm; and the organic layer 13 has a thickness of 5-10 cm.

The pebble layer comprises pebbles with a particle size that is greater than 2 cm and less than the particle size of the agricultural material. When the pebbles have a greater particle size than the agricultural material, the agricultural material falls into the pebble layer and blocks the flow of the rainwater runoff in the pebble layer. The pebble layer 15 has a thickness of 5-10 cm. When the thickness of the pebble layer 15 is increased, the rainwater from the bottom of the overflow weir 5 tends to be evenly distributed across the pebble layer 15.

The pyrite layer 3 comprises quartz sand and pyrite mixed in a volume ratio of (6-8):(4-2); the water flows through the pyrite layer 3 at a seepage velocity of 250-350 mm/h; and the pyrite layer 3 has a thickness of 20-50 cm.

The perforated pipe 7 is disposed in the gravel layer 1; and the outlet end of the perforated pipe is disposed at the same height as the top part of the pyrite layer 3. The pyrite layer 3, the transition layer 2, and the gravel layer 1 constitute a submerged zone of the bioretention pond. The transition layer 2 comprises quartz sand.

The plant layer 4 comprises quartz sand and sandy loam mixed in a volume ratio of (14-17):(3-6); the water flows through the plant layer 4 at a seepage velocity of more than or equal to 150 mm/h; and the plant layer 4 has a thickness of more than or equal to 30 cm so as to support the growth of plants.

The plants in the bioretention pond comprise small-to-medium-sized shrubs or perennial flowers for covering the space left above organic layer 13.

The working principle of the bioretention pond of the disclosure is detailed as follows:

The pyrite layer 3 and the organic layer 13 are substrates that provide electrons for individual or cooperative denitrification.

During a light rain, the rainwater runoff flows along the gravel drainage ditch 11 and the filter plate 6 successively, and then enter the overflow weir 5. The gravel drainage ditch 11 separates large particles from the rainwater runoff and the filter plate 6 filters out small particles, such as plastic and fallen leaves, to allow a smooth flow of the water in the layered substrate. As a runoff velocity is smaller than the seepage velocity of the water in the substrate at the bottom of the overflow weir 5, the rainwater runoff flows through the substrate, is evenly distributed across the pebble layer 15, and even reaches the middle part of the layered substrate, with no or less accumulation of water in the overflow weir 5. The process maximizes the used of the layered substrate. When the rainwater runoff seeps down to the plant layer 4, ammonia nitrogen is adsorbed and converted into nitrate nitrogen by nitrification. The plant layer 4 comprises quartz sand and sandy loam mixed in a volume ratio (14-17):(6-3). When the rainwater runoff flows through the pyrite layer 3, nitrate nitrogen is removed from the rainwater runoff by sulfur-driven autotrophic denitrification. The purified runoff is then discharged into the rainwater pipeline through the perforated pipe 7.

The light rain further comprises short-duration heavy rainfall during which the amount of the rainfall is smaller than the pore volume of the submerged zone (including the pyrite layer 3, the transition layer 2, and the gravel layer 1). In this situation, the nitrate concentration of the effluent is very low because the denitrification process has lowered the concentration of nitrate nitrogen in the rainwater runoff during a dry period. The light rain further comprises a low-intensity rainfall during which the rainwater runoff percolates through the layered substrate at a low velocity, which result in a longer hydraulic retention time in the bioretention pond, thus facilitating the complete removal of nitrate nitrogen by sulfur-driven autotrophic denitrification.

During heavy rainfall, the runoff velocity is greater than the seepage velocity of the water in the substrate at the bottom of the overflow weir 5; the rainwater runoff accumulates in the overflow weir and overflows into the pyrite layer 3 in two ways: 1. flowing through the organic layer 13 and carrying the carbon source from the middle part of the bioretention pond into the pyrite layer 3; and 2. percolating through the pyrite layer 3 according to the flow path as described during the light rain. At the start of the heavy rainfall, no rainwater runoff overflows from the overflow weir and the effluent are the water stored in the submerged zone (including the pyrite layer 3, the transition layer 2, and the gravel layer 1) in which the nitrate nitrogen content has been reduced to a reasonable level. As the rainwater runoff overflows from the overflow weir, the carbon source is transported to the layered substrate and facilitates the heterotrophic denitrification; in this process, the electron moves fast, causing the removal of most of nitrate nitrogen from the rainfall runoff. When the amount of the rainfall runoff is greater than the pore volume of the bioretention pond, excess runoff is directed into the rainwater pipeline through the overflow pipe.

After a heavy rainfall event, the carbon source is retained in the submerged zone; when the next rainfall is light, the rainwater runoff meets the carbon source in the pyrite layer 3 for heterotrophic denitrification; this process consumes large quantities of organic carbon source to remove nitrate nitrogen from the rainwater runoff, thus reducing the secondary pollution from the effluent. The above process is also suitable for use in two continuous heavy rainfall events; at the start of the second heavy rainfall, the rainwater runoff does not overflow and nitrate nitrogen is heterotrophic denitrified heterotrophically.

When the first rainfall is light, the carbon source is retained in the plant layer, without polluting the effluent in the next rainfall event.

The bioretention pond captures sediment and particulate nutrients in the rainwater runoff that may block the flow of the water in the layered substrate; thus, the width of the overflow weir 5 is adjusted once or twice times every year by adjusting a length of the at least one telescoping pole 93, so that the overflow rate is matched to the seepage rate of the rainwater runoff in the bioretention pond in different climate regions.

The overflow weir prevents the light rain from passing through the organic layer, reducing the leaching of the carbon source and avoiding the secondary pollutant from the effluent. The width of the overflow weir is adjusted to regulate the amount of the carbon source for heterotrophic denitrification.

The following advantages are associated with the bioretention pond of the disclosure.

1. The overflow weir is easy to assemble and disassemble, and hence is suitable for use in different climate regions. Every two adjacent inner plates are detachably connected to each other; and the width of the overflow weir is adjustable based on rainfall, runoff, soil properties, and climate changes at the construction site.
2. The width of the overflow weir is adjustable so that the overflow rate is matched to the seepage velocity of the water in the bioretention pond. The bioretention pond captures sediment, particulate nutrients, particulate phosphorus, and the sludge produced by microorganisms and heterotrophic microorganisms, all of which may block the flow of the water in the layered substrate; if this happens, the width of the overflow weir is increased by adjusting the length of the at least one telescoping pole so as to ensure a desired amount of overflow.
3. To improve denitrification during the short-duration heavy rainfall, the autotrophic denitrification is used in conjunction with the heterotrophic denitrification. During the heavy rainfall, the rainwater runoff percolates through the submerged zone in two ways: 1. directly entering the submerged zone; and 2. percolating through the organic layer, and carrying the carbon source into the pyrite layer. The heterotrophic denitrification facilitates the removal of residual nitrate nitrogen that is not used up during the autotrophic denitrification. The width of the overflow weir is adjustable so that a desired amount of the carbon source is carried by the rainwater runoff without polluting the effluent.
4. The organic layer alleviates the secondary pollution. Only during the heavy rainfall does the organic layer play a role. During the light rain, nitrate nitrogen is removed through the sulfur-driven autotrophic denitrification without the use of the carbon source. A slow rainwater runoff does not percolate through the organic layer, which reduces the leaching of the organic matter, nitrogen and phosphorous.

5. The structure of the bioretention pond is simple to construct and repair. The organic carbon source is disposed on the top part of the bioretention pond, which is easy to replace; both the overflow weir and the organic layer are disposed on the surface of the pond wall, which is easy to inspect and repair.

It will be obvious to those skilled in the art that changes and modifications may be made, and therefore, the aim in the appended claims is to cover all such changes and modifications.

What is claimed is:

1. A bioretention pond for rainwater treatment, comprising:
   a pond body; and
   an overflow weir;
   wherein:
   the pond body comprises a pond wall and a layered substrate;
   the layered substrate comprises from bottom to top: a gravel layer, a transition layer, a pyrite layer, a plant layer, a pebble layer, an organic layer, and a water storage layer;
   the overflow weir is disposed on the pebble layer with a space left above a center of the pebble layer;
   the organic layer is disposed in the space and covers the pebble layer;
   the water storage layer is disposed onto the organic layer; and
   the pond body further comprises a perforated pipe, and one end of the perforated pipe is disposed in the gravel layer; and the perforated pipe comprises an outlet end which is flush with a top part of the pyrite layer.

2. The bioretention pond of claim 1, wherein the overflow weir comprises a plurality of outer plates and a plurality of inner plates, and a channel is formed by the plurality of outer plates and the plurality of inner plates; the plurality of outer plates is fixedly disposed on the pond wall; each of the plurality of inner plates comprises a first upper end and a first lower end, both of which comprises at least one telescoping pole; each of the plurality of outer plates comprises a second upper end and a second lower end, both of which comprises at least one threaded hole; the at least one telescoping pole comprises a threaded end connected to the at least one corresponding threaded hole.

3. The bioretention pond of claim 2, wherein one end of each of the plurality of inner plate comprises at least one hook; the other end of each of the plurality of inner plate comprises at least one groove; the at least one hook is latched on a corresponding at least one groove, so that every two adjacent inner plates are connected to each other.

4. The bioretention pond of claim 3, wherein the pond body further comprises an overflow pipe; the overflow pipe comprises an inlet end, and outlet end, two straight sections, and a 90 degree elbow; the two straight sections are connected to each other by the 90 degree elbow; one of the two straight sections is disposed in the plant layer; the other one of the two straight sections extends upward through the organic layer with the inlet end exposed to the water storage layer; and the outlet end is connected to a rainwater pipeline.

5. The bioretention pond of claim 4, wherein the bioretention pond for rainwater treatment further comprises a gravel drainage ditch disposed around the pond body; the gravel drainage ditch comprises a distal side and a proximal side lower than the distal side; the distal side is away from the pond wall, and the proximal side is near the pond wall; the overflow weir is covered with a filter plate; and at least one plant is planted on the plant layer.

6. The bioretention pond of claim 5, wherein the organic layer is an agricultural material comprising bark, sawdust, coconut husk, and corn cob; the agricultural material has a particle size of greater than 2 cm; and the organic layer has a thickness of 5-10 cm.

7. The bioretention pond of claim 6, wherein the pebble layer has a thickness of 5-10 cm and comprises pebbles with a particle size that is greater than 2 cm and less than the particle size of the agricultural material.

8. The bioretention pond of claim 7, wherein the plant layer comprises quartz sand and sandy loam mixed in a volume ratio of (14-17):(3-6); water flows through the plant layer at a seepage velocity of more than or equal to 150 mm/h; and the plant layer has a thickness of more than or equal to 30 cm.

9. The bioretention pond of claim 8, wherein the pyrite layer comprises quartz sand and pyrite mixed in a volume ratio of (6-8):(4-2); water flows through the pyrite layer at a seepage velocity of 250-350 mm/h; and the pyrite layer has a thickness of 20-50 cm.

* * * * *